United States Patent [19]

Altes

[11] Patent Number: 5,491,724
[45] Date of Patent: Feb. 13, 1996

[54] MEAN PHASE PREDICTOR FOR MAXIMUM A POSTERIORI DEMODULATOR

[75] Inventor: Richard A. Altes, La Jolla, Calif.

[73] Assignee: Chirp Corporation, La Jolla, Calif.

[21] Appl. No.: 225,759

[22] Filed: Apr. 11, 1994

Related U.S. Application Data

[63] Continuation-in-part of Ser. No. 607,582, Nov. 1, 1990, Pat. No. 5,303,269.

[51] Int. Cl.$^6$ ..................................................... H03D 3/00
[52] U.S. Cl. ........................................... 375/322; 375/324
[58] Field of Search ................................. 375/78, 80, 82, 375/84; 329/300, 304

[56] References Cited

U.S. PATENT DOCUMENTS 5,001,424  3/1991  Birgenbeier et al. ................. 375/118
5,303,269  4/1994  Altes ........................................ 375/78

OTHER PUBLICATIONS

John D. Provence—Proceeding of 1988 IEEE International Symposium on Circuits and Systems; pp. 2382 through 2385; Dated Jun. 7–9, 1988; Title: Neural Network Implementation for an Adaptive Maximum–Likelihood Receiver.

*Primary Examiner*—Stephen Chin
*Assistant Examiner*—T. Ghebretinsae
*Attorney, Agent, or Firm*—Knobbe, Martens, Olson and Bear

[57] ABSTRACT

A system and method for optimal maximum a posteriori (MAP) demodulation using a novel mean phase predictor. The mean phase predictor conducts cumulative averaging over multiple blocks of phase samples to provide accurate prior mean phases, to be input into a MAP phase estimator.

16 Claims, 4 Drawing Sheets

MEAN PHASE PREDICTOR FOR MAXIMUM A POSTERIORI DEMODULATOR

STATEMENT REGARDING GOVERNMENTAL RIGHTS

The present invention was made with support from the United States Government under Contract Nos. NAS3-26959, NAS3-26391 awarded by the National Aeronautics and Space Administration (NASA). The Government has certain rights in the invention.

Related Application

The present application is a continuation-in-part of application U.S. Ser. No. 07/607,582, filed Nov. 1, 1990, now U.S. Pat. No. 5,303,269.

BACKGROUND OF THE INVENTION

1. Field of the Invention

The present invention relates to communications systems and, more particularly, to phase angle demodulators.

2. Description of the Related Technology

Most electronic communication systems in use today include a transmitter to transmit an electromagnetic signal and a receiver to receive the transmitted signal. The transmitted signal is typically corrupted by noise and, therefore, the receiver must operate with received data that reflects the combination of the transmitted signal and noise. Thus, the receiver receives data y(t) at a time t, where y(t)=s(t)+n(t), the sum of the transmitted signal and additive noise. The received data equation can be expanded as follows:

$$y(t) = \sqrt{2} \, A\cos[\omega_o t + \theta(t)] + n(t)$$

where A is the signal amplitude, $\omega_o$ is the carrier or reference frequency, $\theta(t)$ is the time-varying phase function and n(t) is noise.

Many of these communication systems require that the receiver demodulate information in the received signal which depends on proper demodulation of the signal phase angle at all times during transmission. The demodulation of the signal phase angle is problematic in view of the pervasiveness of noise. Therefore, for this class of receivers it is desirable to optimize phase demodulation, which is equivalent to optimizing an estimation of the phase function $\theta(t)$.

Analog communication involves modulation that varies monotonically with an applied signal, e.g., a change in frequency that is proportional to the voltage at the output of a microphone as is the case in frequency modulation (FM) radio. An analog FM signal can be analyzed by measuring the phase of the signal at a sequence of sampling times via in-phase and quadrature components, as described in the parent patent application, now having U.S. Pat. No. 5,303,269, which is hereby incorporated by reference. These components can be used to obtain a block of preliminary phase samples $\alpha(k\Delta)$, k=1,2, . . . ,N. A corresponding block of expected or prior mean phase samples $\theta_m(k\Delta)$, k=1,2, . . . ,N is also presumably available. The prior mean samples are predictions of phase angle based on past data.

The parent application shows how a Hopfield neural network can be used to solve for the maximum a posteriori (MAP) phase estimates $\{\hat{\theta}(k\Delta); k=1,2, . . . ,N\}$ based on the preliminary phase samples $\{\alpha(k\Delta); k=1,2, . . . ,N\}$, the corresponding prior mean or predicated phase samples $\{\theta_m(k\Delta); k=1,2, . . . ,N\}$, and the expected autocovariance function of the estimated phase shifts, $R_\theta[(k-j)\Delta]$, in a MAP demodulator. Ideally, the sample block is at least as long as the nonzero support of the autocovariance function. The most accurate phase estimate is obtained for the sample at the middle of the block. If the autocovariance function is nonzero over a set of 31 samples between (k–15)Δ and (k+15)Δ, for example, then a block composed of 31 phase shift samples between (k–15)Δ and (k+15)Δ would be used to estimate $\hat{\theta}(k\Delta)$. The output of the Hopfield network also contains phase samples between (k–15)Δ and (k+15)Δ, but samples near the block edges are not as accurate as those near the center of the block. Thus, in a MAP demodulator, it is desired to increase the accuracy of phase estimates which are generated based upon blocks of phase samples using a MAP estimator and a mean phase estimator.

SUMMARY OF THE INVENTION

In a maximum a posteriori (MAP) phase angle demodulator, the present invention utilizes extra MAP phase estimates for cumulative estimation of the prior mean phase vector $\bar{\theta}_m$. Extra estimates are obtained from overlapping data blocks corresponding to a sliding window. Only the estimate at the center of the window is used as the output MAP phase estimate for each window position.

The presently preferred MAP demodulator, which includes a Hopfield network, uses preliminary phase estimates obtained from data samples $\{\alpha(k\Delta)=\arctan[Q(k\Delta)/I(k\Delta)]$; k=1,2, . . . $\}$ along with corresponding prior phase estimates $\{\theta_m(k\Delta); k=1,2, . . . \}$ to compute posterior phase estimates $\{\hat{\theta}(k\Delta); k=1,2, . . . \}$ for a block of N samples. Prior phase estimates are called "prior mean phase estimates" because they correspond to the mean value of a prior probability distribution. The phase values $\{\alpha(k\Delta), \theta_m(k\Delta),$ and $\hat{\theta}(k\Delta); k=1,2, . . . \}$ are "unwrapped" by adaptively adding $2\pi$, 0, or $-2\pi$ so as to reduce large absolute differences between succeeding phase values. For example, if $|\alpha(k\Delta)-\alpha[(k-1)\Delta]|$ is greater than $\pi$ radians, then either $2\pi$ or $-2\pi$ is added to $\alpha(k\Delta)$ to produce an unwrapped $\alpha$ time series with $|\alpha(k\Delta)-\alpha[(k-1)\Delta]|\leq\pi$. Phase differences $\{\alpha(k\Delta)-\theta_m(k\Delta)\}$ and $\{\alpha(k\Delta)-\hat{\theta}(k\Delta)\}$ are constrained to lie between $-\pi$ and $\pi$ by a similar operation (addition of $2\pi$ or $-2\pi$ so that the differences lie in the prescribed interval).

The most reliable MAP estimate is at the center of the block; the remaining estimated phase samples are extraneous if the block is translated by one sampling interval $\Delta$ and a new set of MAP estimates is obtained for each block position. The problem is how to exploit the extra, unused MAP phase estimates at each block position, as well as how to obtain the best possible estimate of $\{\theta_m(k\Delta)\}$. The original patent application suggests using linear (autoregressive) prediction of the samples in a given block from MAP phase estimates in a previous block.

For highly overlapping blocks, MAP estimates $\hat{\theta}(\Delta)$, $\hat{\theta}(2\Delta), . . . , \hat{\theta}(N\Delta)$ from the first block position can be used as prior mean values for estimates of $\theta(2\Delta), \theta(3\Delta), . . . , \theta(N\Delta)$ for the next block position, which contains samples $2\Delta, . . . , (N+1)\Delta$. Since there is no prior measurement of the sample at $(N+1)\Delta$, the prior value of this sample is predicted from $\hat{\theta}(\Delta), \hat{\theta}(2\Delta), . . . , \hat{\theta}(N\Delta)$ via autoregression, where $\hat{\theta}(k\Delta)$, k=1, . . . , N are determined from the first block position. The third block position contains samples $3\Delta, 4\Delta, . . . , (N+2)\Delta$. The prior value of each phase sample $\theta(3\Delta), . . . , \theta(N\Delta)$ can now be predicted by an average of two phase estimates obtained from the two preceding block positions, since these samples are common to the two blocks. The prior mean value of θ[(N+1)Δ] is obtained from an average of an autoregressive prediction from the first block position and a MAP estimate from the second block position. The prior mean value of θ[(N+2)Δ] is obtained via autoregressive prediction using all the other prior mean values in the block. Iteration yields a cumulative average estimate of each prior mean phase value in a block. The MAP phase estimate is extracted from the center of the block.

The present MAP demodulator uses a window (block of samples) with duration equal to the support of the autocovariance function $R_θ[(k-j)Δ]$, which is 31 samples in this example, with sampling interval $Δ≡1$ for simplicity. The best MAP sample is obtained from the center of the block, but all estimated phase samples are used in cumulative averages to estimate the prior mean phase vector $θ_m(k-15), \ldots, θ_m(k+15)$ for succeeding block positions.

These and other objects and features of the present invention will become more fully apparent from the following description and appended claims taken in conjunction with the accompanying drawings.

DETAILED DESCRIPTION OF THE PREFERRED EMBODIMENTS

Reference is now made to the drawings wherein like numerals refer to like parts throughout.

Figure 1:
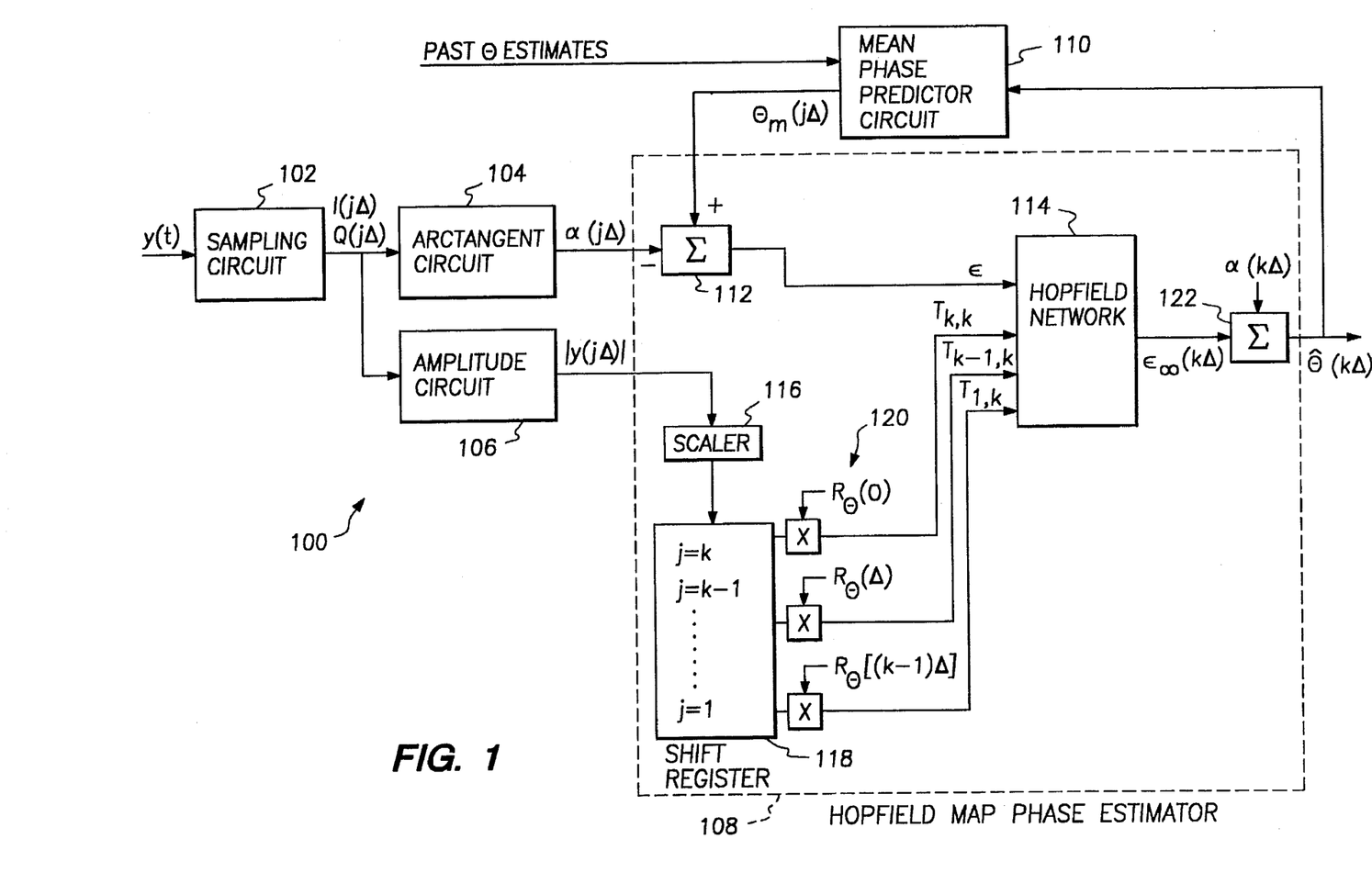
FIG. 1 is a block diagram of one presently preferred embodiment of a maximum a posteriori (MAP) angle demodulator using a Hopfield network.

FIG. 1 illustrates one preferred embodiment of a maximum a posteriori (MAP) demodulator 100. The background of a general implementation for the MAP demodulator 100 can be found in U.S. Pat. No. 5,3103,269.

Essentially, the MAP demodulator 100 receives a phase modulated signal such as, for example, an FM broadcast signal. A sampling circuit 102 periodically samples the integrated products of the received signal y(t) with two local oscillator signals, $\cos(ω_ot)$ and $\sin(ω_ot)$, where $ω_o$ is the carrier frequency. The products of $y(t)\cos(ω_ot)$ and $y(t)\sin(ω_ot)$ are integrated over an interval Δ, and the integrator outputs are sampled at intervals of $jΔ, j=1, \ldots, N$, to generate sampled in-phase and quadrature components, $I(jΔ)$ and $Q(jΔ), j=1, \ldots, N$. The sampled components are fed into an arctangent circuit 104 and an amplitude circuit 106. The arctangent circuit 104 performs the function $\arctan(Q/I)$, where the received signal comprises in-phase (I) and quadrature (Q) components, to provide a time series of phase samples $α(jΔ)$. The amplitude circuit 106 outputs a time series of sample amplitudes $|y(jΔ)|$. The sample phase and amplitudes from the circuits 104, 106 are fed into a Hopfield MAP phase estimator 108. The MAP estimator 108 also receives a predicted mean phase $θ_m(jΔ)$. The MAP estimator 108 provides an estimated phase $\hat{θ}(kΔ)$ at its output. Thus, the desired goal of the MAP demodulator 100 is to achieve an accurate estimate of the phase of the received signal y(t).

The estimated phase $\hat{θ}(kΔ)$ is fed back to a mean phase predictor circuit 110, which also receives past phase estimates. The mean phase predictor circuit 110 generates the predicted mean phase, which is fed into the MAP phase estimator 108.

The presently preferred MAP estimator 108 is structurally arranged as follows. A summing amplifier 112 accepts the phase samples from the arctangent circuit 104 and subtracts each sample from a corresponding predicted mean phase and provides the result to a Hopfield network 114. The Hopfield network 114 also receives input signals as a function of the amplitude samples after, optionally, processing the signal via a scaling circuit 116, and processing by a shift register 118 and the multipliers 120 which multiply the signal by the autocovariance function $R_θ[(k-j)Δ]$. The output of the Hopfield network 114 is fed into a summing amplifier 122 to result in the phase estimate $\hat{θ}(kΔ)$, the end product of the demodulator 100.

The MAP demodulator 100 processes a block of N samples at a time. If the Hopfield implementation converges sufficiently quickly (as expected), the block moves by one-sample increments. Although the MAP demodulator 100 produces phase estimates for all samples in the block, the sample at the center of the block is the most accurate and is passed to the output as the MAP phase estimate. The MAP estimate is based on N preliminary phase estimates or phase samples $\{α(nΔ)=\arctan[Q(nΔ)/I(nΔ)]\}$, where {I,Q} are in-phase and quadrature components obtained from received data. The MAP estimator 108 also utilizes N prior mean phase values $\{θ_m(nΔ)\}$ representing the best available information prior to obtaining each new phase estimate.

In addition to the preliminary phase estimates $\{α\}$ and the prior mean phase estimates $\{θ_m\}$, the MAP demodulator 100 utilizes the phase covariance function $R_θ[(i-j)Δ]$. The block size N ideally corresponds to the support of this covariance function, i.e., the number of samples over which it is not identically zero.

If the Hopfield network has convergence time $T_c ≤ Δ$, the block will move by only one sample interval Δ between estimates. The phase estimate $\hat{θ}[(k+1)Δ]$ will then be based on preliminary and predicted phase estimates between $(k-14)Δ$ and $(k+16)Δ$. Overlapping blocks imply that nearly all the phase samples used to obtain $\hat{θ}(kΔ)$ are also used to obtain $\hat{θ}[(k+1)Δ]$. Hopfield/MAP phase estimates for $(k-14)Δ$ through $(k+15)Δ$ are obtained as part of the output of the MAP phase estimator 108 for $\hat{θ}(kΔ)$. Although the estimates near the edges of the block are not as accurate as those at the center, all the MAP estimates can be used in a cumulative average to obtain an updated version of $θ_m[(k-14)Δ]$ through $θ_m[(k+15)Δ]$.

The prior mean estimate $θ_m[(k+16)Δ]$ corresponds to a new phase sample at the right-hand side of the block, corresponding to translation of the block by one sample. This new phase value can be predicted via autoregression from the updated values of $θ_m[(k-14)Δ]$ through $θ_m[(k+15)Δ]$ and the autocovariance function $R_θ[(k-j)Δ]$. As the sampling window that determines the block of samples moves to the right, successive MAP phase estimates at the same sample position are obtained and averaged. The prior mean phase estimate $θ_m[(k-15)Δ]$ at the left hand edge of the block is based on an average of 30 previous MAP estimates and one linear prediction.

Figure 2:
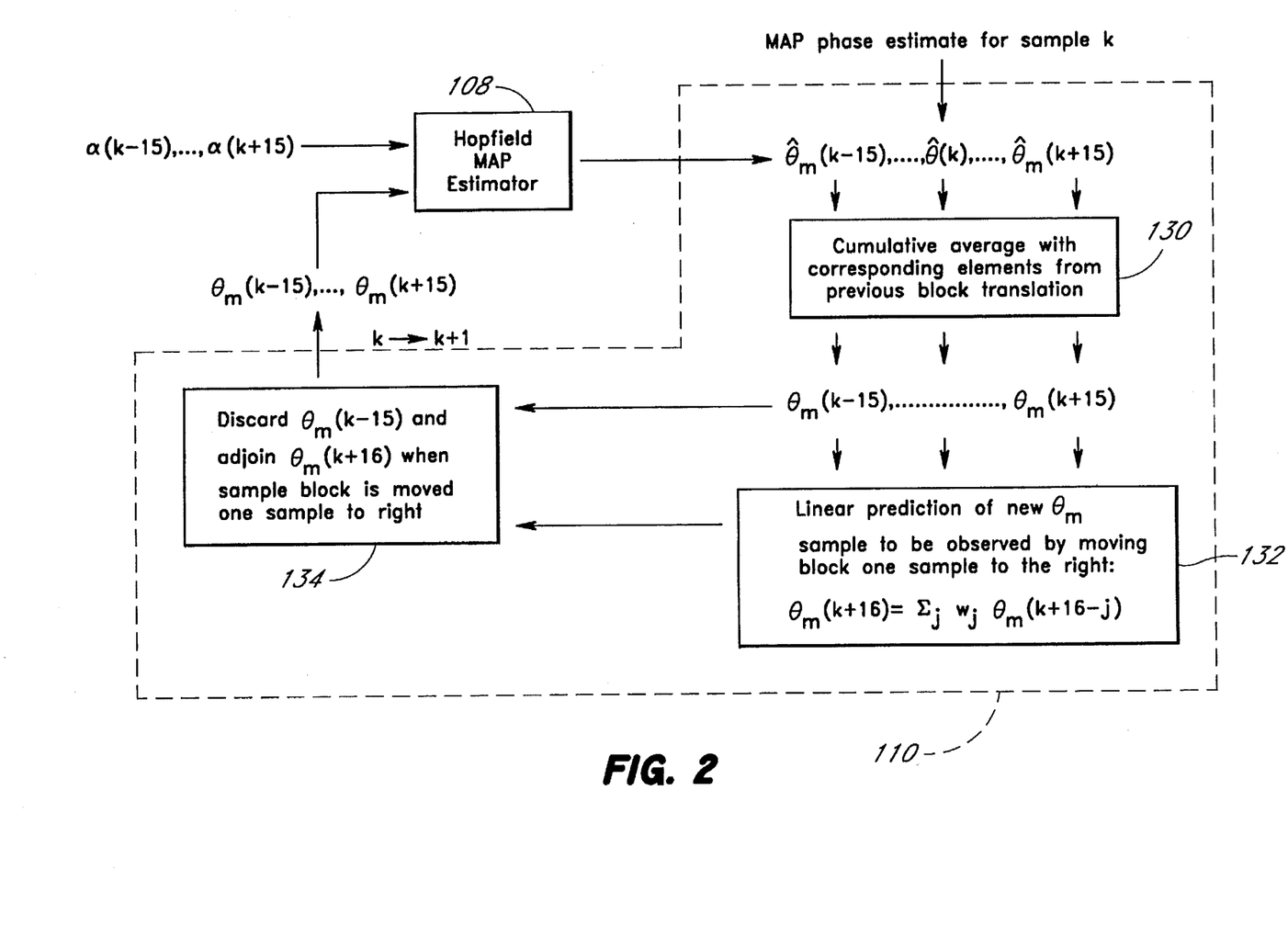
FIG. 2 is a functional block diagram of one presently preferred embodiment of the mean phase predictor circuit in a MAP demodulator, of the present invention, shown in FIG. 1.

The predictive process for phase angles, of the present invention, is illustrated in FIG. 2. Given $\alpha[(k-15)\Delta], \ldots, \alpha[(k+15)\Delta]$ and $\theta_m[(k-15)\Delta], \ldots, \theta_m[(k+15)\Delta]$, the MAP estimator 108 yields a set of phase estimates $\hat{\theta}[(k-15)\Delta], \ldots, \hat{\theta}[(k+15)\Delta]$, with the best estimate $\hat{\theta}(k\Delta)$ at the center. The new set of phase estimates is used to update the $\theta_m$-vector by cumulative averaging of new $\hat{\theta}$-values with old $\theta_m$-values corresponding to the same position in time via a cumulative average circuit 130. If N samples $\hat{\theta}_1(j\Delta), \hat{\theta}_2(j\Delta), \ldots, \hat{\theta}_N(j\Delta)$ have already been averaged to obtain $\theta_{m,N}(j\Delta)$, the next sample is included in the cumulative average by computing $\theta_{m,N+1}(j\Delta)=[1/(N+1)]\hat{\theta}_{N+1}(j\Delta)+[N/(N+1)]\theta_{m,N}(j\Delta)$. In a linear predictor circuit 132, weights $w_1, \ldots, w_{31}$ are obtained from the covariance matrix corresponding to $R_\theta[(k-j)]$ as in the parent application.

The MAP demodulator 100, of the present invention, uses a window (block of samples) with duration equal to the support of the autocovariance function $R_\theta[(k-j)\Delta]$, which is 31 samples in this example, with sampling interval $\Delta \equiv 1$ for simplicity. The best MAP estimate is obtained from the center of the window, but all estimated phase samples are used in cumulative averages to estimate the prior mean phase vector $\theta_m(k-15), \ldots, \theta_m(k+15)$ for succeeding window positions.

Let $\theta_{mj}(n\Delta) \equiv$ the update of $\theta_m(n\Delta)$ corresponding to a block containing samples $n=j+1, \ldots, j+N$;

$\hat{\theta}_j(n\Delta) \equiv$ MAP phase estimates in a block containing samples $n=j, \ldots, j+N-1$. (1)

The initial (j=0) block contains samples $\{\theta(n\Delta); n=1, \ldots, N\}$. For blind initiation of the update process, $\theta_{m0}(n\Delta)$ can be set to $\alpha(n\Delta), n=1, \ldots, N$. For a given transmitted initiation signal with phase samples $\theta_0(\Delta), \ldots, \theta_0(N\Delta)$, the initial prior mean phase sample $\theta_{m0}(n\Delta)$ equals $\theta_0(n\Delta), n=1, \ldots, N$.

Map estimates for the first block position $\{\hat{\theta}_1(n\Delta); n=1, \ldots, N\}$ are obtained using $\{\theta_{m0}(n\Delta); n=1, \ldots, N\}$ and $\{\alpha(n\Delta); n=1, \ldots, N\}$. Updated prior mean phase estimates are then computed for samples relevant to the second block position, containing samples $2, \ldots, N+1$:

$$\theta_{m1}(n\Delta)=(\tfrac{1}{2})\hat{\theta}_1(n\Delta)+(\tfrac{1}{2})\theta_{m0}(n\Delta),\ n=2,\ldots,N. \quad (2)$$

The second N-sample block should also include $\theta_{m1}[(N+1)\Delta]$, which can be predicted from the previous N' samples via the autoregressive estimate $$\theta_{m1}[(N+1)\Delta] = \sum_{j=1}^{N'} a_j \theta_{m1}[(N+1-j)\Delta] \quad (3)$$

where $$\underline{a}=[a_1 a_2 \ldots a_{N'}]^T = \underline{R}_\theta^{-1} \underline{r}_\theta \quad (4)$$

and the elements of the N'×N' matrix $\underline{R}_\theta$ and the column vector $\underline{r}_\theta$ are $$[\underline{R}_\theta]_{ij}=R_\theta[(i-j)\Delta]=E\{\theta[(N+1-i)\Delta]\} \quad (5)$$

$$[\underline{r}_\theta]_i=R_\theta(i\Delta)=E\{\theta[(N+1)\Delta]\theta[(N+1-i)\Delta]\}. \quad (6)$$

If the total support of the symmetric covariance function is N samples, then only $$\begin{aligned} N' &= (N-1)/2,\ \text{for}\ N\ \text{odd} \\ &= N/2,\ \text{for}\ N\ \text{even} \end{aligned} \quad (7)$$

previous phase samples have nonzero correlation with $\theta[(N+1)\Delta]$.

After MAP estimates for the second block position, $\{\hat{\theta}_2(n\Delta); n=2, \ldots, N+1\}$, are computed from $\{\theta_{m1}(n\Delta), \alpha(n\Delta); n=2, \ldots, N+1\}$, updated prior mean phase estimates are obtained for samples relevant to the third block position, which contains samples $3, \ldots, N+2$:

$$\theta_{m2}(n\Delta)=(\tfrac{1}{3})\hat{\theta}_2(n\Delta)+(\tfrac{2}{3})\theta_{m1}(n\Delta),\ n=3,\ldots,N \quad (8)$$

$$\theta_{m2}[(N+1)\Delta]=(\tfrac{1}{2})\hat{\theta}_2[(N+1)\Delta]+(\tfrac{1}{2})\theta_{m1}[(N+1)\Delta] \quad (9)$$

$$\theta_{m2}[(N+2)\Delta] = \sum_{j=1}^{N'} a_j \theta_{m2}[(N+2-j)\Delta] \quad (10)$$

where $\underline{a}$ is defined in a manner analogous to (4)–(6).

In general, the first prior mean value for sample N+k is computed from linear prediction, using samples from the kth block position, which contains samples $k, \ldots, k+N-1$;

$$\theta_{mk}[(N+k)\Delta] = \sum_{j=1}^{N'} a_j \theta_{mk}[(N+k-j)\Delta]. \quad (11)$$

For the following block positions, the value of $\theta_m[(N+k)\Delta]$ is updated by a weighted sum of MAP estimates and past prior mean estimates, until sample $(N+k)\Delta$ is no longer part of the block:

$$\theta_{m,k+j}[(N+k)\Delta]=[1/(j+1)]\hat{\theta}_{k+j}[(N+k)\Delta]+[j/(j+1)]\theta_{m,k+j-1}[(N+k)\Delta],$$
$$j=1,2,\ldots,N-1. \quad (12)$$

When j=N−1, the left hand edge of the block coincides with $(N+k)\Delta$. When j=N, the block no longer contains sample $\theta[(N+k)\Delta]$, and $\theta_m[(N+k)\Delta]$ is discarded by an N-sample shift register containing the relevant data block for MAP phase estimation.

Figure 3:
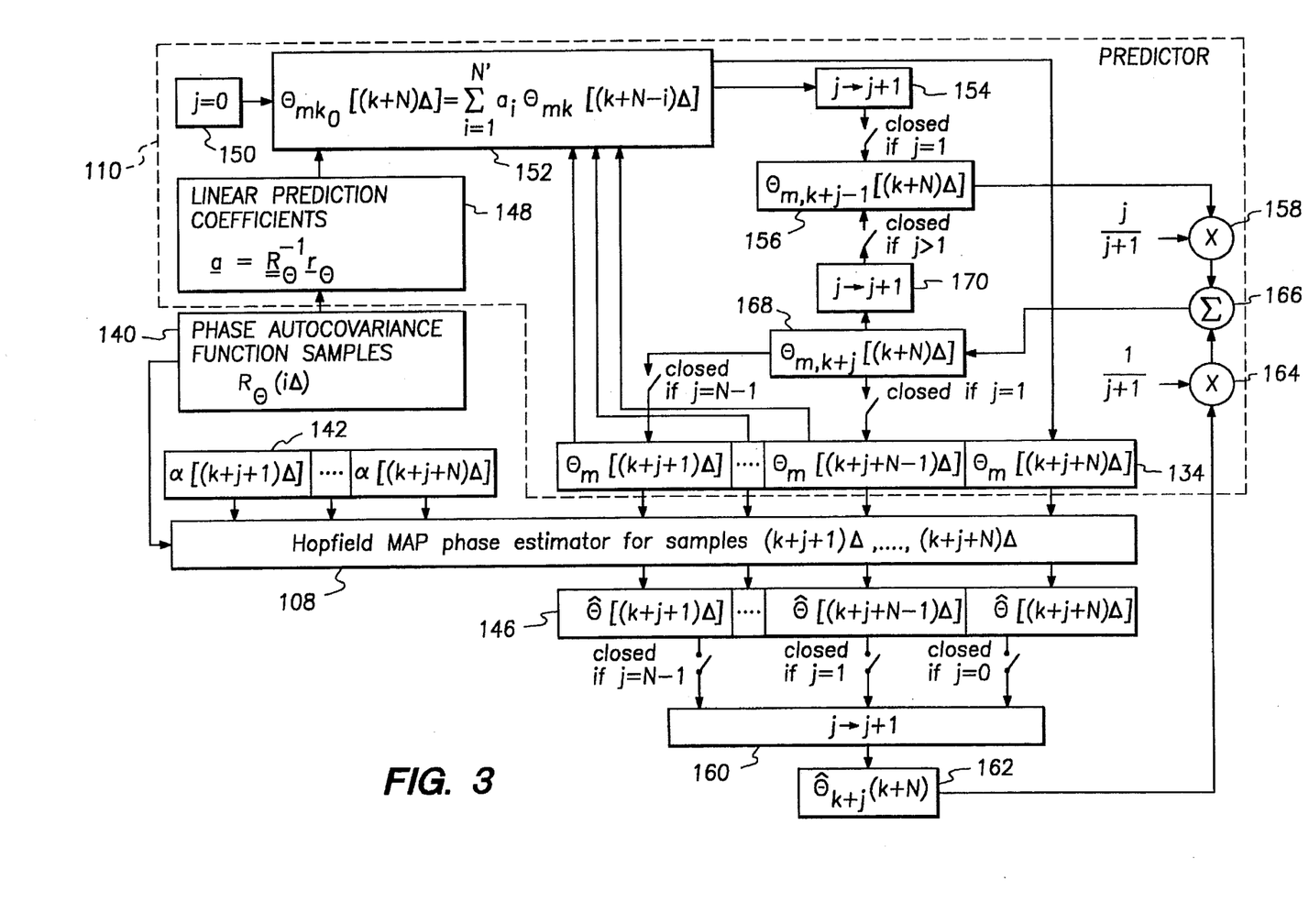
FIG. 3 is a detailed block diagram of one presently preferred embodiment of the mean phase predictor circuit, of the present invention, shown in FIG. 1.

The presently preferred mean phase predictor circuit 110 of the present invention is shown in more detail in FIG. 3, in conjunction with the MAP estimator 108 and associated interface circuitry. The MAP estimator 108 receives phase autocovariance function samples 140, and blocks of phase samples and prior mean phases via shift registers 142, 134, respectively. The output of the MAP estimator 108 is fed into a shift register 146.

As discussed above, the predictor circuit 110 must be initialized with a prior mean phase based upon a linear prediction. The samples 140 are also received by the predictor circuit 110 via a linear prediction coefficients circuit 148. A block of initial phase samples 150 is fed into a first mean phase circuit 152. The source of the initial prior mean phase estimates is described just after Equation (1) above. The circuit 152 also accepts signals indicative of prior mean phases from the shift register 134. The prediction of $\theta_m[(N+k)\Delta]$, performed by the circuit 152, which is the estimate of $\theta_m[(N+k)\Delta]$ for the sample block $\theta[(k+1)\Delta], \ldots, \theta[(N+k)\Delta]$, is obtained as in Equation (11) above.

The circuitry 130 to accomplish the cumulative averaging is shown in FIG. 3 as the following components: increment and load control 154, prior mean phase register 156, multiplier 158, increment and load control 160, phase estimate register 162, multiplier 164, summing amplifier 166 and current mean phase register 168. The cumulative averaging process is described by Equation (12) above for sample $\theta_m[(N+k)\Delta]$, where $K \geq 1$.

The mechanism for dropping off (discarding) an irrelevant prior mean phase estimate at the left edge of a block and acquiring (adjoining) a new prior mean phase estimate at the right edge of the block is to pass updated prior mean phase samples along the length-N shift register 134 corresponding to the block of samples that are being processed by the MAP demodulator 108. When a sample reaches the left edge of the block, it is discarded on the next iteration.

It will be recognized that the present invention can be implemented in a variety of different ways. As but one example, the demodulator could be implemented using integrated circuit components, including a significant amount of digital logic, but the Hopfield network would preferably be constructed using analog circuitry, requiring appropriate D/A and A/D conversion, to achieve a fast rate of convergence. Of course, standard engineering techniques allow for implementations tending to emphasize computer, optical, electrical, or other methods, with engineering and economic trade-offs restricting each implementation as a practical matter.

Figure 4:
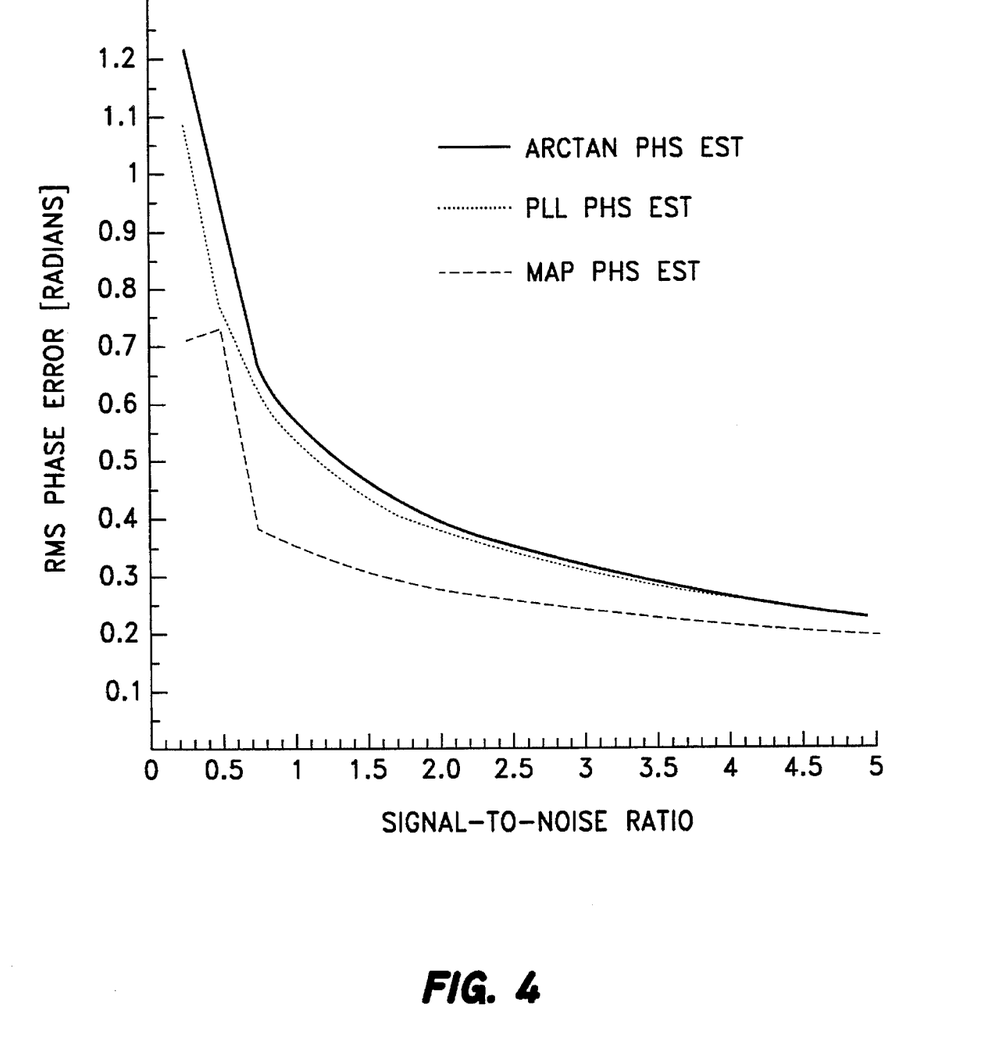
FIG. 4 is a performance graph plotting root-mean-square (RMS) phase error vs. signal-to-noise (SNR) ratio, and comparing an arctangent phase estimator, a phase-locked loop (PLL) phase estimator, and the maximum a posteriori (MAP) phase estimator of the present invention.

FIG. 4 is a graphical comparison of three demodulators for angle modulated analog communication signals as measured by root-mean-square (RMS) error vs. signal-to-noise ratio (SNR). The performance of the MAP phase estimator 108 in FIG. 2 relative to that of a digital phase-locked loop (PLL) and the preliminary arctangent phase estimates $\alpha(k\Delta)$ is shown in FIG. 4. The loop filter in the digital PLL uses the autocovariance function $R_\theta[(k-j)\Delta]$ to linearly predict the next phase sample on the basis of 31 past phase estimates, as in FIG. 2. The predicted phase sample $\theta_m(k\Delta)$ is used to form a sinusoidal reference signal which is correlated with received data over a sampling interval $\Delta$ to produce a phase error term $\theta(k\Delta)-\theta_m(k\Delta)$. The PLL estimate $\hat{\theta}(k\Delta)$ is obtained by adding $\theta_m(k\Delta)$ to the phase error. In an analog PLL, this addition operation is performed by an integrator, which may be part of the loop filter.

Performance in FIG. 4 is measured in terms of root-mean-square (RMS) phase error between a sequence of estimated phase samples and phase samples extracted from a simulated FM signal. White, Gaussian noise is added to the simulated FM signal, and rms error is shown as a function of input signal-to-noise ratio (SNR). At a given SNR value, the MAP phase estimator in FIG. 2 has roughly the same performance as a phase-locked loop operating on a signal with twice the given SNR.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A maximum a posteriori demodulator, comprising:

a maximum a posteriori (MAP) estimator receiving a block of N phase samples $\{\alpha(\Delta), \ldots, \alpha(N\Delta)\}$ and a block of N prior mean phase estimates $\{\theta_m(\Delta), \ldots, \theta_m(N\Delta)\}$, wherein the estimator generates a block of N phase estimates $\{\hat{\theta}(\Delta), \ldots, \hat{\theta}(N\Delta)\}$; and a mean phase predictor, comprising:

a cumulative averager receiving the block of phase estimates $\{\hat{\theta}(\Delta), \ldots, \hat{\theta}(N\Delta)\}$ and averaging the block with corresponding elements from previous block averages so as to provide the block of prior mean phase estimates $\{\theta_m(\Delta), \ldots, \theta_m(N\Delta)\}$;

a linear predictor receiving the prior mean phase estimates $\{\theta_m(\Delta), \ldots, \theta_m(N\Delta)\}$ and predicting a new prior mean phase estimate $\theta_m[(N+1)\Delta]$; and a shift register receiving the prior mean estimates $\{\theta_m(\Delta), \ldots, \theta_m(N\Delta)\}$ and new prior mean phase estimate $\theta_m[(N+1)\Delta]$ such that the first in time prior mean estimate $\theta_m(\Delta)$ is shifted out and a new block of prior mean phase estimates $\theta_m(2\Delta), \ldots, \theta_m[(N+1)\Delta]$ is provided to the MAP estimator at time $(N+1)\Delta$.

2. The demodulator of claim 1, additionally comprising an arctangent circuit providing the block of N phase samples to the MAP estimator.

3. The demodulator of claim 1, additionally comprising an amplitude circuit providing a plurality of amplitude samples to the MAP estimator.

4. The demodulator of claim 1, wherein the MAP estimator includes:

a first summer receiving the phase samples and the prior mean phase estimates so as to provide a block of N phase differences; and a Hopfield network receiving the phase differences so as to generate a phase error at any one selected sample time $\Delta$.

5. The demodulator of claim 4, wherein the MAP estimator additionally includes a second summer receiving the phase error and one of the phase samples at the any one selected time so as to generate one of the phase estimates at the any one selected time.

6. The demodulator of claim 1, wherein the linear predictor comprises a circuit to calculate the equation:

$$\theta_{mk}[(N+k)\Delta] = \sum_{j=1}^{N'} a_j \theta_{mk}[(N+k-j)\Delta]$$

where $\theta_{mk}$ is the new prior mean phase block calculated from the phase samples beginning at time $k\Delta$, $N'=(N-1)/2$, for N odd $=N/2$, for N even, $a_j$ is a linear prediction coefficient for sample j.

7. The demodulator of claim 1, wherein the cumulative average comprises a circuit to calculate the equation:

$$\theta_{m,k+j}[(N+k)\Delta]=[1/(j+1)]\hat{\theta}_{k+j}[(N+k)\Delta]+ [j/(j+1)]\theta_{m,k+j-1}[(N+k)\Delta],$$
$$j=1,2,\ldots,N-1$$

where $\theta_{m,k+j}$ is the new prior mean phase block calculated from the phase samples beginning at the time $(k+j+1)\Delta$, and $\hat{\theta}_{k+j}$ is the block of MAP phase estimates beginning at time $(k+j)\Delta$.

8. A method of maximum a posteriori demodulation, the method comprising the steps of:

receiving a block of N phase samples $\{\alpha(\Delta), \ldots, \alpha(N\Delta)\}$ and a block of N prior mean phase estimates $\{\theta_m(\Delta), \ldots, \theta_m(N\Delta)\}$;

estimating a block of N phase estimates $\{\hat{\theta}(\Delta), \ldots, \hat{\theta}(N\Delta)\}$ from the received block of phase samples and the received block of prior mean phase estimates;

averaging the block of phase estimates $\{\hat{\theta}(\Delta), \ldots, \hat{\theta}(N\Delta)\}$ with corresponding elements from previous block averages so as to provide a cumulative average block of prior mean phase estimates $\{\theta_m(\Delta), \ldots, \theta_m(N\Delta)\}$;

predicting a new prior mean phase estimate $\theta_m[(N+1)\Delta]$ from the cumulative average block of prior mean phase estimates; and generating a new block of prior mean phase estimates $\{\theta_m(\Delta), \ldots, \theta_m[(N+1)\Delta]\}$ at time $(N+1)\Delta$ from the cumulative average block of prior mean phase estimates and the new prior mean phase estimate.

9. The method defined in claim 8, additionally comprising the step of repeating the method by substituting a new block of N phase samples $\{\alpha(\Delta), \ldots, \alpha((N+1)\Delta)\}$ and the new block of prior mean phase estimates in the receiving step.

10. The method defined in claim 8, wherein the generating step includes the steps of:
  discarding the first in time prior mean estimate $\theta_m(\Delta)$ from the cumulative average block; and
  adjoining the predicted new prior mean phase estimate to the cumulative average block.

11. A maximum a posteriori demodulator, comprising:
  means for estimating a block of phase samples and a block of prior mean phase estimates, said estimating means providing a block of phase estimates;
  means, responsive to said estimating means, for averaging the block of phase estimates with corresponding elements from previous block averages, said averaging means providing a block of prior mean phase estimates;
  means, responsive to said averaging means, predicting a new prior mean phase estimate from the block of prior mean phase estimates; and
  a circuit receiving the block of prior mean phase estimates and new prior mean phase estimate, said circuit capable of discarding the first in time prior mean phase estimate and adjoining the new prior mean phase estimate to the block of prior mean phase estimates.

12. The demodulator of claim 11, additionally comprising a phase sampler providing the block of phase samples.

13. The demodulator of claim 11, additionally comprising an amplitude sampler providing a block of amplitude samples.

14. The demodulator of claim 11, wherein said estimating means includes a Hopfield network.

15. A maximum a posteriori (MAP) demodulator, comprising:
  a mean phase predictor generating a block of prior mean phases;
  a MAP estimator receiving phase autocovariance function samples $R_\theta(i\Delta)$, a block of phase samples $\{\alpha[(k+j+1)\Delta], \ldots, \alpha[(k+j+N)\Delta]\}$, and the block of prior mean phases $\{\theta_m[(k+j+1)\Delta], \ldots, \theta_m[(k+j+N)\Delta]\}$, wherein the estimator generates a block of phase estimates $\{\hat{\theta}[(k+j+1)\Delta], \ldots \hat{\theta}[(k+j+N)\Delta]\}$; and
  a shift circuit receiving the block of phase estimates $\{\hat{\theta}[(k+j+1)\Delta], \ldots \hat{\theta}[(k+j+N)\Delta]\}$ and generating updated mean phase estimates that are provided to the mean phase predictor.

16. The demodulator of claim 15, wherein the mean phase predictor comprises:
  a linear prediction coefficients circuit receiving the phase autocovariance function samples $R_\theta(i\Delta)$, wherein the circuit calculates the linear prediction coefficient $\underline{a}$ using the equation $\underline{a} = R_\theta^{-1} \underline{r}_\theta$;
  a first mean phase circuit receiving a block of initial phase samples, the linear prediction coefficient $\underline{a}$, and a block of prior mean phases $\{\theta_m[(k+j+1)\Delta], \ldots, \theta_m[(k+j+N)\Delta]\}$, wherein the first mean phase circuit calculates a first prior mean phase using the equation $$\theta_{mk}[(N+k)\Delta] = \sum_{j=1}^{N} a_j \theta_{mk}[(N+k-j)\Delta];$$

a cumulative averager, comprising:
  a first increment and load control, connected to the first mean phase circuit, receiving the first prior mean phase $\theta_{mk}[(N+k)\Delta]$;
  a second increment and load control, connected to a current mean phase register, receiving the current mean phase $\theta_{m,k+j}[(K+N)\Delta]$;
  a prior mean phase register receiving the first prior mean phase at time a from the first increment and load control and the current mean phase at time $2\Delta$ from the second increment and load controller;
  a first multiplier, connected to the prior mean phase register, receiving prior mean phase $\theta_{m,k+j-1}[(k+N)\Delta\}$ and multiplying by $$\frac{j}{j+1};$$

a second multiplier, connected to a phase estimate register, receiving the phase estimates $\hat{\theta}_{k+j}(k+N)$ and multiplying by $$\frac{1}{j+1};$$

a summing amplifier totalling the results of the first multiplier and the second multiplier; and
  the current mean phase register receiving the current mean phase $\theta_{m,k+j}[(k+N)\Delta]$ from the summing amplifier.

* * * * *

UNITED STATES PATENT AND TRADEMARK OFFICE
CERTIFICATE OF CORRECTION

PATENT NO. : 5,491,724
DATED : February 13, 1996
INVENTOR(S) : Richard A. Altes

It is certified that error appears in the above-indentified patent and that said Letters Patent is hereby corrected as shown below:

Claim 16

Column 10, Line 24 should read -- time Δ from --

Signed and Sealed this

Fourteenth Day of October, 1997

Attest:

BRUCE LEHMAN

Attesting Officer

Commissioner of Patents and Trademarks